R. W. Clark.
Forge-Hearth.
N° 73502. Fig. 1 Patented Jan. 21, 1868.
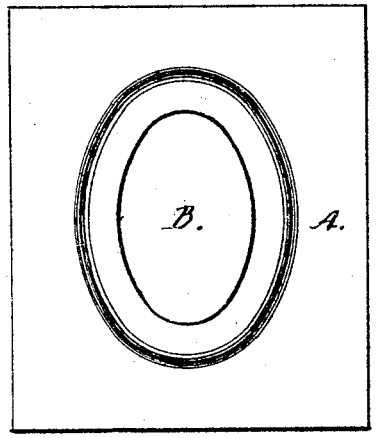
Fig. 2
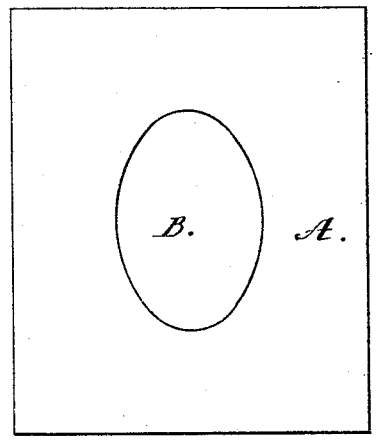
Fig. 3.
John D. Bloor
Edwin James
Inventor,
Robert W. Clark
pr Holmead & Hollingshead
attorneys.

United States Patent Office.

ROBERT W. CLARK, OF PITTSBURG, PENNSYLVANIA.

Letters Patent No. 73,502, dated January 21, 1868.

IMPROVEMENT IN FORGE-HEARTHS.

*The Schedule referred to in these Letters Patent and making part of the same.*

TO ALL WHOM IT MAY CONCERN:

Be it known that I, ROBERT W. CLARK, of Pittsburg, in the county of Allegheny, and State of Pennsylvania, have invented a certain new and useful Improvement in Forge-Hearths or Plates; and I hereby declare that the following is a full, clear, and exact description of the same, reference being had to the annexed drawings, and to the letters of reference marked thereon, making part of this specification, in which—

Figure 1 is a top view.
Figure 2 is a bottom view.
Figure 3 is a sectional view.

The nature of my invention is the employing in smiths' forges of a solid fire-clay hearth, having in its centre an oval or circular-shaped orifice, smaller below than above; and when used with my improved tuyere-iron, the hole is made to correspond with the said tuyere-iron top; but I do not restrict my invention to any size or shape, which can be made to suit any other tuyere or ordinary smith's bellows-nozzle iron.

In the drawing, A is the fire-brick, B the oval-shaped opening. In ordinary smiths forges made of brick or stone, and where the common tuyere-irons are used, so soon as the iron is burned out, it becomes necessary to tear up the hearth to get at the tuyere-iron, and after it has been removed, and an entirely new iron placed on the forge, the masonry must be relaid, and to insure good work, the fire-clay with which it is usual to lay the bricks, must be gradually dried before the fire should be put on it, otherwise the clay will not hold the bricks, and hence a derangement takes place, and the blast from the tuyere is constantly spreading in the joints of the masonry, and is wasted. In my invention, having no joints, this defect is obviated. When the forge is properly prepared for the brick, having its foundation well settled, it is only necessary to lift the brick, remove the tuyere-iron, place in its stead a new one, reset the hearth, all of which will not consume three minutes, and the forge is ready for work. Where my improved tuyere is used, it is only necessary to back out the keys, replace the top, and this does not consume more time than just stated.

Having thus described my invention, what I claim as new therein, and desire to secure by Letters Patent of the United States, is—

The use of a single fire-clay brick or tile in blacksmiths' forges, substantially as described, as a new article of manufacture.

In testimony whereof, I have signed my name to this specification in the presence of two subscribing witnesses.

ROBERT W. CLARK.

Witnesses:
J. DONALDSON,
JOHN CASSELS.